United States Patent Office 3,823,092
Patented July 9, 1974

3,823,092
PROCESS FOR PREPARING CRACKING CATALYSTS HAVING IMPROVED REGENERATION PROPERTIES
Elroy M. Gladrow, Baton Rouge, La., assignor to Esso Research and Engineering Company
No Drawing. Filed Jan. 24, 1972, Ser. No. 220,497
Int. Cl. B01j *11/40*
U.S. Cl. 252—455 Z                    3 Claims

ABSTRACT OF THE DISCLOSURE

The regeneration properties of cracking catalysts are improved by incorporating into a rare earth exchanged zeolite composite catalyst a small additional amount of cerium cations randomly distributed throughout the composite catalyst.

---

This invention relates to an improved composite catalyst for use in transforming organic compounds catalytically convertible in the presence of acidic catalyst sites. Such conversion processes include, for example, primarily cracking, but also alkylation, isomerization, polymerization, aromatization and dealkylation. The improved catalyst comprises a zeolite having a substantial portion of rare earth cations embedded in a silica-alumina gel matrix which, prior to final calcination, has been treated with a solution containing cerium cations or a mixture of rare earth cations having a substantial amount of cerium. This new catalyst is characterized by having improved regeneration properties. The invention also relates to a method for preparing improved catalysts of this type.

The new composite catalyst of this invention comprises a high activity component which is a crystalline alumino silicate zeolite having an ordered structure of rigid three dimensional networks characterized by pores and having openings of nearly uniform diameter in the range of greater than 4 and less than 15 A. units. The remainder of the composite comprises material which possesses a lower order of catalytic activity than the zeolite component. Although it may be non-porous and/or chemically inert, the remainder of the composite preferably comprises a porous material which possesses substantial catalytic activity by itself, but which is, however, of a lower order than that of the zeolite. This remainder material is referred to herein as a matrix and is preferably an amorphous silica-alumina gel. The zeolite component is dispersed throughout the remainder of the composite by simple mechanical admixture of finely divided particles of the components and in other ways known to the art.

In a particular embodiment, the present invention relates to the catalytic conversion of a hydrocarbon charge into lower boiling normally liquid and normally gaseous products and to an improved cracking catalyst characterized by its ability to be regenerated at a rapid rate. While the description which follows is directed to the cracking of hydrocarbon charged stocks, it is within the purview of this invention to utilize the catalyst as such or with suitable modification in other processes catalyzed by the presence of acidic catalyst sites.

As it is well known, there are numerous materials, both of natural and synthetic origin, which have the ability to catalyze the cracking of hydrocarbons. However, the mere ability to catalyze cracking is far from sufficient to afford a catalyst of commercial significance. Of the currently commercially available cracking catalysts, snythetic silica alumina composite catalysts are by far the most widely used. Among these are the crystalline alumino silicates such as zeolites A, X and Y, as well as certain naturally occurring zeolites, embedded in a silica-alumina matrix. Especially useful in the practice of this invention are zeolite Y, and synthetic faujasite.

During catalytic conversion of high boiling hydrocarbons to low boiling hydrocarbons, the reaction which takes place is essentially a cracking to produce lighter hydrocarbons. It is, however, accompanied by a number of complex side reactions, such as aromatization, polymerization, alkylation and the like. As a result of these complex reactions, a hydrocarbonaceous deposit, commonly called "coke" is laid down on the catalyst. The deposition of coke tends to seriously impair the catalytic efficiency of the catalyst for the principal reaction and the conversion reaction is thereafter suspended after coke to the extent of a few percent by weight has accumulated on the catalyst. The catalytic surface is then regenerated by burning the coke in a stream of oxidizing gas and the catalyst is returned to the conversion stage of the cycle.

As will be realized, coke and other undesired products are formed at the expense of useful products, such as gasoline. It will also be evident that, during the period of regeneration, the catalyst is not being effectively employed for conversion purposes. Accordingly, it is highly desirable not only to provide a catalyst of high activity (i.e., to afford a large overall conversion of the hydrocarbon charge) but also to afford an enhanced yield of useful products, while maintaining the undesired product, such as coke, at a minimum.

As a result of coke formation, it has generally been necessary to regenerate the catalyst at frequent intervals, first by stripping out entrained oil, e.g. by contacting with steam, and then burning off the carbonaceous deposits by contacting the catalyst with an oxygen containing gas at an elevated temperature. However, in the early years of developing the catalytic cracking process, it was found that the cracking activity of the catalyst deteriorates upon repeated use and regeneration and that the silica-alumina catalysts which were employed were sensitive to steaming. There were then developed catalytic compositions comprising an intimate admixture of a porous matrix material and a crystalline alumino silicate zeolite, the cations of which consisted primarily of metals characterized by a substantial portion of rare earth metal. These catalytic compositions, which had a low sodium content (e.g., less than about 5% by weight), were found to be extremely durable and to have good steam resistance.

A typical rare earth containing catalyst of this type comprises about 8.5% of faujasite embedded in a silica-alumina matrix. Catalysts of this type shown extremely high cracking activity in batch fluid units, dense bed fluid units, and transfer line cracking operations. Because of the nature of the operation in batch fluid units and dense bed fluid units, the regeneration rates of these catalysts have been commercially quite satisfactory. However, in transfer line or riser cracking operations, it is imperative that the catalyst regeneration rate be as fast as possible so as to reduce the amount of catalyst held in the regenerator.

In accordance with the present invention, there are now provided new rare earth exchanged zeolite catalytic compositions which are capable of being regenerated at a rate much faster than the rare earth exchanged zeolite catalytic compositions heretofore in use. These new compositions are produced by treating the washed composite catalyst with a dilute solution containing cerium cations or a mixture of rare earth cations having a substantial portion of cerium prior to the final filtering, rinsing, and calcining steps. Further details concerning the new catalyst composition and methods for their production will be found in the description which follows.

The crystalline alumino silicate zeolites employed in the preparation of the novel catalysts of this invention may be either natural or synthetic zeolites. Representatives of particularly preferred zeolites are the faujasites, including the synthetic materials such as zeolite X and zeolite Y, well known in the art, as well as other crystalline alumino silicate zeolites having pore openings of between 4 and 15 A. units. These materials are essentially the dehydrated forms of crystalline hydrous siliceous zeolites containing varying quantities of alkali metal and ammonium, with or without other metals. The alkali metal atoms, silicon, aluminum and oxygen in the zeolites are arranged in the form of an alumino silicate salt in a definite and consistent crystalline pattern. The structure contains a large number of small cavities interconnected by a number of still smaller holes or channels. These cavities and channels are uniform in size. The alkali metal alumino silicate used for the preparation of these new catalysts has a highly ordered crystalline structure characterized by pores having openings of uniform sizes within the range greater than 4 and less than 15 A. units, preferably between 6 and 15 A. units, the pore openings being sufficiently large to admit the molecules of the hydrocarbon charge desired to be converted.

These crystalline alumino silicate zeolites have been treated to replace all, or at least a substantial proportion of, the original alkali metal ions with other cations, particularly metal cations characterized by a substantial portion of rare earth cations. Other metal cations which can be used in conjunction with rare earths to replace the original alkali metal ions include calcium, magnesium, manganese, chromium, aluminum, zirconium, vanadium, nickel, cobalt, iron and mixtures of one or more of the foregoing. The choice of a particular metal or metal cation will depend primarily upon the particular conversion process for which the catalyst is intended. When the catalyst is to be used for cracking, a major portion of the alkali metal cations of the zeolite are preferably replaced by rare earth metal cations alone. The chemical treatment of the zeolites with a medium containing a compound of the desired replacement metal, in particular a rare earth, results in a crystalline alumino silicate having a structure modified primarily to the extent of having cations of the desired replacement metal adsorbed or ionically bonded thereto. A characteristic of the product of this exchange is the fact that the sum of equivalence of alkali metal ion and of other metal ions will substantially equal the number of gram atoms of aluminum in the alumino silicate, the equivalent weight of rare earth being based on a valence of 3.

The exchange of the alkali metal in the zeolite, which is preferably accomplished before admixture with the matrix material, is done, for example, in a fluid medium having dissolved therein a compound or compounds containing the desired replacement metal cations. Further details concerning this replacement process may be found in U.S. Pat. No. 3,459,680. As noted above, the cations should consist of, or comprise, rare earth metal cations. Representatives of the rare earth metals which may be used include lanthanum, cerium, neodymium, praseodymium, samarium, gadolinium and yttrium. Generally the rare earth metals are employed in the form of their chloride salts or oxides, but other metal salts such as the nitrates and sulfates may also be used.

The highly active cation exchange zeolite is then combined, dispersed or otherwise intimately intermixed with a matrix material which possesses a lower order of catalytic activity. The matrix material is both porous and catalytically active and includes preferably those silica-alumina catalysts known to have high octane number producing properties, for example, silica-alumina gels. Silica is generally present in these gels as the major component with the alumina present in minor proportion. Particularly suitable as matrices in the practice of the instant invention are the commercial silica-alumina hydrogels having from about 70% to 95% silica and from about 30% to about 5% alumina. Especially suitable is the commercial hydrogel comprising 87% silica and 13% alumina.

The cation exchanged zeolite, which has been reduced to a particle size of less than 40 microns, preferably less than 10 microns, is then intimately admixed with the matrix material. Prior to this admixing step, it is advantageous to have the zeolite precalcined in order to lock the rare earth ions into positions from which they would not be removed by the washing steps which take place after admixture with the matrix. The admixing step itself is performed according to methods well known in the art. For example, the mixture may be made while the silica-alumina gel is in a hydrous state such as in the form of a hydrosol, hydrogel, wet gelatinous precipitate or mixtures thereof. The zeolite-siliceous gel composite thus obtained is spray dried or tray dried, ground, and then washed by standard procedures so as to remove any soluble salts contained therein. The total alkali metal content of the resulting composite, including alkali metals which may be present in the zeolite as an impurity, is less than 4%, and preferably less than about 1%. The composite preferably comprises from about 5–15% by weight of the zeolite.

After this composite material is washed, it is subjected to the process of the instant invention. This process comprises treating the composite catalyst with a dilute solution containing cerium cations or a mixture of rare earth cations having a substantial amount of cerium.

This treatment may be accomplished in a manner similar to the process used in replacing the alkali metal cations of the zeolite with rare earth or other cations. The procedure employed comprises essentially the contacting of the composite catalyst with a dilute solution containing cerium cations. The temperature of the solution can be conveniently between about room temperature and about 150° F., preferably from about 90° to 130° F. The procedure for carrying out this treatment may be accomplished in a batchwise or a continuous method under atmospheric, sub-atmospheric or superatmospheric pressure. A solution of the cerium ions to be introduced in the form of an aqueous solution may be passed slowly through a bed of the composite catalyst, or the cerium salt in measured amount may be added to an aqueous slurry of the washed, composite catalyst.

A wide variety of compounds of cerium may be employed with facility as a source of the replacing ions. Operable compounds generally include those which are sufficiently soluble in the fluid medium (in most cases, water). Usually metal salts such as the chlorides, nitrates and sulfates are employed.

After this cerium treatment is completed, the composite catalyst is then dried and calcined according to methods known in the art. The resulting catalyst contains between about 0.5 and 4.0 percent of cerium oxide ($Ce_2O_3$), preferably between about 0.70 and 3.40 percent.

It has been found that the zeolite composite catalysts, treated with cerium in the above described manner, are substantially equal in catalytic cracking activity to those which have not been so treated. The advantage of this cerium treatment, however, is illustrated in the fact that the regeneration rates of the cerium treated zeolite catalyst is substantially greater—of an order of 2 or 3 times—than the regeneration rates of the zeolite catalysts heretofore in use. Furthermore, it has been discovered that the improved regeneration rate results from treatment with cerium specifically; treatment with other rare earth cations does not appear to have this marked effect.

Without wishing to be bound by any specific theory, it appears that the cerium, which is distributed randomly throughout the zeolite and the matrix, acts as an oxidation promotor.

The invention is further described in the following specific comparative examples which are deemed not to be limiting but merely illustrative of said invention.

Example 1

The catalyst of this example is a high zeolite content catalyst, not subjected to cerium treatment. In a blending vessel, 1745 grams unwashed silica-alumina hydrogel (10.5 wt. percent $SiO_2+Al_2O_3$ catalytic solids) are mixed with 400 cc. $H_2O$ and 21.15 grams of low soda (0.31%

Na₂O) pre-exchanged rare earth form faujasite (equivalent to 17.0 g. H-form zeolite Y) blended into the gel. The rare earth faujasite was precalcined to lock in the rare earth so that it would not migrate during the ensuing washing steps. The composite slurry was dried, ground and washed by standard procedures to reduce the soda and sulfate levels to 0.02 and 0.01%, respectively. The catalyst was dried and calcined directly. This catalyst comprises about 8.5% rare earth exchanged zeolite Y and 91.5% hydrogel (13% $Al_2O_3$/87% $SiO_2$) and is designated "A" below.

Example 2

This catalyst is a catalyst according to this invention. In a blending vessel 1745 grams unwashed silica-alumina hydrogel as in Example 1 are mixed with 400 cc. $H_2O$ and 21.15 grams low soda (0.31% $Na_2O$) pre-exchanged rare earth form faujasite blended into the gel slurry. The rare earth faujasite was precalcined to lock the rare earth ions into positions from which they would not be removed by the subsequent washing steps. The composite slurry was dried, ground and washed by standard procedures to reduce the soda and sulfate contents to the levels of Example 1. The wet filter cake was reslurried in warm water and a mixture of rare earth chlorides, comprising about 45% cerium, was added (equivalent to 1.5 g. $RE_2O_3$) slowly, keeping the slurry at 125° F. for 15 minutes, then filtering and rinsing with water. The catalyst was then dried and calcined. This catalyst comprises about 8.5% rare earth exchanged zeolite Y and 91.5% silica-alumina hydrogel and has received in addition a 0.75% $RE_2O_3$ dosage treatment. It is designated "B" below.

Example 3

The catalyst of this example is a commercially available zeolite containing catalyst. Sodium faujasite is slurried in unwashed silica-alumina gel, spray dried, washed to low soda and sulfate levels, reslurried in dilute rare earth solution containing cerium cations, filtered and rinsed, dried and calcined. This catalyst contains about 5% faujasite and 95% silica-alumina hydrogel with about 1.0% $RE_2O_3$ distributed between the zeolite and the gel matrix. It is designated "C" below.

Example 4

The catalyst of this example is commercial silica-alumina hydrogel. It comprises 25% $Al_2O_3$ and 75% $SiO_2$ and is an amorphous gel. It is designated "D" below.

Example 5

The catalyst of this example is Davison DZ-7 catalyst which is believed to contain about 10–12% pre rare earth exchanged faujasite (low soda content, <0.3% $Na_2O$) dispersed in a mixed matrix containing about one half kaolin and one half silica-alumina gel. It is designated "E" below.

Example 6

The catalyst of this example is Filtrol 800. It is believed to comprise at least 10% rare earth form faujasite dispersed in a matrix containing halloysite and amorphous silica-alumina gel. It is designated "F" below.

Example 7

Catalysts A, B, C, D, E and F were each steamed at 1400° F. for 16 hours at 0 p.s.i.g. and tested in a batch fluid unit at 950° F. feeding a 500–700° F. VGO over a 2 minute process period. The cracking results are summarized at 60% conversion in the table below.

TABLE

| Catalyst | A | B | C | D | E | F |
| --- | --- | --- | --- | --- | --- | --- |
| At 60% conv.: | | | | | | |
| W./hr./W | 18 | 17 | 6 | 2 | 13 | 7.8 |
| Carbon, wt. percent | 0.6 | 0.6 | 0.8 | 2.7 | 0.9 | 1.4 |
| C₅/430° F., wt. percent | 46.5 | 46.5 | 42.2 | 34.2 | 43.4 | 40.8 |

The data attest to the superior performance both as regards activity and selectivity of catalyst A and catalyst B of the invention. However, these data do not set forth the improved regeneration property of the catalyst of this invention.

Example 8

The spent catalysts from the tests made and described in Example 7, and containing carbon were studied for the carbon burning rate properties. Samples of each spent catalyst were placed in a zone and heated to 1112° F. in an atmosphere of pure nitrogen. When there was no further indication of a weight loss, a regeneration gas (2% $O_2$ in $N_2$) was introduced and the rate of weight loss measured as a function of time. Assuming that first order kinetics apply to the oxidation of catalytic carbon, the following equation results:

$$k \text{ (min.}^{-1}) = \frac{2.303}{t} \log \frac{C_0}{C}$$

where $k$ is the kinetic rate constant, $t$ is the time in minutes that the spent catalyst is exposed to the regeneration gas, $C_0$ is the amount of carbon present at the beginning of the burning and $C$ is the amount of carbon remaining at time $t$. The kinetic rate constant for each catalyst is tabulated below:

| Catalyst | $k$ (min.$^{-1}$) at 1112° F. |
| --- | --- |
| A | 0.089 |
| B | 0.136 |
| C | 0.049 |
| D | 0.045 |
| E | 0.048 |
| F | 0.077 |

The data clearly show that catalyst A and catalyst B of this invention show a much improved carbon burning propensity than any of the other catalysts, each of which is a catalyst of commerce. In addition, catalyst B of the invention shows about a 50% improvement in carbon burning rate over catalyst A. This is due to the additional cerium treatment given the catalyst. It should be noted that catalyst C also received a cerium treatment, of a composite catalyst comprising NH₄-Y at the time of the treatment and it did not show improved carbon burning properties. Therefore, it is concluded that the catalyst of this invention must comprise a low soda (<5% $Na_2O$) zeolite in the rare earth form which has been calcined to lock the rare earths into the zeolite structure, and the final composite catalyst undergoes an additional dilute rare earth treatment to deposit a small amount of cerium in the catalyst composite. As the data show, the catalyst of the invention is regenerated at about 2–2.5 times the rate of many widely used commercial cracking catalysts.

Example 9

The catalyst of this example is the catalyst for comparing the other catalysts in subsequent examples.

In a 40 gallon vessel, 134 lbs. of unwashed silica-alumina hydrogel (containing 10.5% catalytic solids) were blended with 90 lbs. $H_2O$ and colloid milled. Calcined are earth exchanged zeolite Y in an amount of 754 grams (equivalent to 1.33 lbs. H-Y) was slurried in 10 lbs. $H_2O$ and colloid milled. The two slurries were blended together, the composite colloid milled and then spray dried. The material was washed free of undesired soluble salts to yield a catalyst comprising 8.5% rare earth exchanged zeolite Y and 91.5% silica-alumina gel. The catalyst had all of the rare earths locked within the faujasite structure. It is designated catalyst "G."

Example 10

A recipe similar to Example 9 was used to make a catalyst of the same composition as that of Example 9 except that after the last washing and filtration step, the catalyst in the form of a wet filter cake was reslurried in water and didymium chloride (equivalent to 1.5% as oxide based on total catalyst) added. Didymium is a mixture of light rare earths from which almost all of the cerium has been removed. After 15 minutes the slurry was filtered, rinsed, dried and calcined. The catalyst analyzed 3.0% total rare earths as oxide, of which 2.1% are calculated as being locked into the faujasite and 0.9% are contained in the silica-alumina gel matrix, but this latter is essentially devoid of cerium. This catalyst is designated "H."

Example 11

The catalyst of this example was made exactly like that of Example 10 except that the final wet filter cake was slurried in a dilute cerous nitrate solution (equivalent to 1.5 wt. percent as $Ce_2O_3$ based on total dry catalyst). The slurry was filtered, rinsed, dried and calcined at 1000° F. The catalyst analyzed 3.5% total rare earth oxdies, of which 2.1% are locked into the faujasite and 1.4% cerium oxide are contained in the matrix. The catalyst is designated "I."

Example 12

The catalyst of this example was made exactly like that that of Example 10 except the final washed wet filter cake was reslurried in a dilute praseodymium solution (equivalent to 1.5 wt. percent $Pr_2O_3$ based on total dry catalyst) for 15 minutes, filtered, rinsed, dried and calcined at 1000° F. It analyzed 3.4% total rare earth oxides of which 2.1% were locked into the faujasite and 1.3% (essentially all $Pr_2O_3$) with the silica-alumina gel matrix. This catalyst is designated "J."

Example 13

Catalysts G, H, I and J were each calcined in air at 1000° F. and then steamed at 1400° F. at atmospheric pressure for 16 hours. The catalysts were then tested in a batch fluid unit at 950° F. feeding a 500–700° F. VGO over a 2 minute process period. The cracking results are summarized at 60% conversion in the table below.

| Catalyst | G | H | I | J |
|---|---|---|---|---|
| Oxidation promoter | None | Didymium | Ce | Pr |
| At 60% conv.: | | | | |
| W./hr./W | 17 | 17 | 19 | 20 |
| Carbon, wt. percent | 0.6 | 0.5 | 0.6 | 0.4 |
| $C_5$/430° F., wt. percent | 45.7 | 45.7 | 46.1 | 45.8 |

The data show that none of the oxidation promoters present in the matrix of catalysts H, I and J adversely affect the activity/selectivity properties of the catalysts compared to catalyst "G."

Example 14

The spent catalysts from the cracking tests made and described in Example 13 and containing carbon were studied for their carbon burning rate properties. The technique was that described in Example 8. The kinetic rate constants for the regeneration of each catalyst at 1112° F. and 1200° F. are summarized below.

| Catalyst | G | H | I | J |
|---|---|---|---|---|
| Promotor | None | Didymium | Ce | Pr |
| Kinetic rate constant (min. $^{-1}$) at— | | | | |
| 1,112° F | 0.087 | 0.076 | 0.123 | 0.058 |
| 1,200° F | 0.211 | 0.232 | 0.345 | 0.147 |

The data show that neither didymium nor praseodymium were effective oxidation promoters in that the carbon burning rate constants were about the same (catalyst H) or lower (catalyst J) than for the nonpromoted catalyst G. On the other hand, catalyst I shows a substantial increase in the carbon burning rate and this must be attributed to cerium. Referring back to the data for catalyst B shown in Example 8 which used mixed rare earths as promoter, it will be observed that the carbon burning rates for catalysts B and H are about the same at 1112° F. The mixed rare earths comprise about 45% cerium. Thus, it appears that both the mixed rare earths containing cerium or cerium alone added to the matrix in small amount acts as an effective promoter for the regeneration of zeolite type cracking catalysts.

What is claimed is:

1. A process for preparing a hydrocarbon conversion catalyst comprising cerium cations incorporated into a silica alumina gel matrix and a rare earth crystalline aluminosilicate, which comprises:
    (a) replacing a substantial portion of the original alkali metal ions of a crystalline aluminosilicate zeolite with rare earth metal cations;
    (b) calcining said rare earth exchanged crystalline aluminosilicate zeolite;
    (c) combining said crystalline aluminosilicate zeolite with a silica-alumina matrix by intimately intermixing said materials; and
    (d) contacting said calcined rare earth metal exchanged crystalline aluminosilicate zeolite composite with a dilute solution containing cerium cations, such that said final hydrocarbon conversion catalyst contains from about 0.5 to about 4.0 weight percent cerium cations.

2. The process of claim 1 wherein the total alkali metal content of said hydrocarbon conversion catalyst is less than 4 wt. percent.

3. The process of claim 1 wherein said contacting with said cerium cations is carried out at a temperature from about 90 to 130° F.

References Cited

UNITED STATES PATENTS

| 3,375,065 | 3/1968 | McDaniel et al. | 252—455 Z |
| 3,459,680 | 8/1969 | Plank et al. | 252—455 Z |

CARL F. DEES, Primary Examiner